(12) United States Patent
Miller

(10) Patent No.: US 8,706,452 B2
(45) Date of Patent: Apr. 22, 2014

(54) SYSTEM AND METHOD FOR COLLISION-FREE CAD DESIGN OF PIPE AND TUBE PATHS

(75) Inventor: Justin H. Miller, O'Fallon, MO (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 466 days.

(21) Appl. No.: 12/491,085

(22) Filed: Jun. 24, 2009

(65) Prior Publication Data
US 2009/0326876 A1    Dec. 31, 2009

Related U.S. Application Data

(60) Provisional application No. 61/075,927, filed on Jun. 26, 2008.

(51) Int. Cl.
*G06F 17/50* (2006.01)
*G06F 7/60* (2006.01)

(52) U.S. Cl.
USPC .................................................. 703/2; 703/6

(58) Field of Classification Search
USPC ........................................................ 703/2, 6
See application file for complete search history.

(56) References Cited

U.S. PATENT DOCUMENTS

| | | | |
|---|---|---|---|
| 5,506,950 A * | 4/1996 | Hughes et al. | 345/420 |
| 6,272,387 B1 * | 8/2001 | Yoon | 700/83 |
| 6,842,173 B2 * | 1/2005 | Sakakura et al. | 345/419 |
| 6,867,768 B2 * | 3/2005 | Sakakura et al. | 345/419 |
| 6,968,289 B1 * | 11/2005 | Tsuchiya et al. | 702/155 |
| 6,970,755 B2 * | 11/2005 | Sakakura et al. | 700/97 |
| 7,013,236 B2 * | 3/2006 | Nono et al. | 702/159 |

(Continued)

FOREIGN PATENT DOCUMENTS

| | | |
|---|---|---|
| CN | 1553382 A | 12/2008 |
| JP | 2007011553 A | 1/2007 |
| JP | 2007219988 A | 8/2007 |

OTHER PUBLICATIONS

Kabul et al. "Cable Route Planning in Complex Environments Using Constrained Sampling", ACM symposium on Solid and physical modeling, p. 402. ACM, New York (2007).*

(Continued)

*Primary Examiner* — Shambhavi Patel

(57) ABSTRACT

A system, method, and computer program product for automated creation of collision-free paths for pipes and tubes in a CAD system. A method includes receiving inputs, in a data processing system, defining at least a start point and destination point for a pipe in a CAD environment, and a diameter for the pipe. The method includes determining sample points between the start point and destination point. The method also includes building a graph including the sample points and the start point and the destination points as nodes and a plurality of edges connecting the nodes. The method also includes computing a path through the graph between the start point and the destination point. The method also includes, for each node in the path, testing each edge connected to the node to determine if there is a collision along the edge between a test object model and a background model geometry in the CAD environment, and removing from the graph any edge that has a collision. If there is no collision along an edge of the path, then designating the path as a successful path and displaying the successful path to a user by the data processing system.

24 Claims, 11 Drawing Sheets

(56) References Cited

U.S. PATENT DOCUMENTS

| | | | |
|---|---|---|---|
| 7,105,746 B2* | 9/2006 | Shimura | 174/72 A |
| 7,200,537 B2* | 4/2007 | Ozaki | 703/7 |
| 7,308,389 B2* | 12/2007 | Sawai et al. | 703/6 |
| 7,383,162 B2* | 6/2008 | Hashima et al. | 703/2 |
| 7,403,829 B2* | 7/2008 | Yamane | 700/97 |
| 7,444,269 B2* | 10/2008 | Drumheller | 703/1 |
| 7,480,596 B2* | 1/2009 | Hashima et al. | 703/1 |
| 7,529,638 B2* | 5/2009 | Sawai et al. | 702/150 |
| 7,558,705 B1* | 7/2009 | Hughes et al. | 703/1 |
| 7,996,190 B2* | 8/2011 | Huizar Rodriguez et al. | 703/1 |
| 8,150,661 B2* | 4/2012 | Demizu et al. | 703/1 |
| 2002/0040256 A1* | 4/2002 | Fujioka | 700/97 |
| 2003/0020711 A1* | 1/2003 | Sakakura et al. | 345/420 |
| 2003/0020715 A1* | 1/2003 | Sakakura et al. | 345/424 |
| 2003/0023947 A1* | 1/2003 | Sakakura et al. | 716/17 |
| 2003/0050723 A1* | 3/2003 | Ozaki | 700/97 |
| 2004/0019399 A1* | 1/2004 | Kabasawa | 700/121 |
| 2004/0130878 A1* | 7/2004 | Sawai et al. | 361/826 |
| 2004/0230403 A1* | 11/2004 | Tsuchiya et al. | 703/1 |
| 2005/0006127 A1* | 1/2005 | Shimura | 174/72 A |
| 2005/0119773 A1* | 6/2005 | Hashima et al. | 700/97 |
| 2005/0240383 A1* | 10/2005 | Hashima et al. | 703/7 |
| 2007/0038415 A1* | 2/2007 | Okada et al. | 703/1 |
| 2007/0088530 A1* | 4/2007 | Erignac et al. | 703/1 |
| 2007/0232120 A1* | 10/2007 | Shimizu | 439/358 |
| 2008/0015824 A1* | 1/2008 | Grichnik et al. | 703/1 |
| 2009/0066100 A1* | 3/2009 | Bosscher et al. | 294/86.4 |
| 2009/0276194 A1* | 11/2009 | Kidera et al. | 703/1 |
| 2010/0122451 A1* | 5/2010 | Yang et al. | 29/703 |

OTHER PUBLICATIONS

Guirardello et al. "Optimization of Process Plant Layout with Pipe Routing", 2005.*

Park et al. "Pipe-Routing Algorithm Development: Case Study of a Ship Engine Room Design", Expert Systems with Applications 23 (2002) 299-309.*

Kruusmaa et al. "Repeated Path Planning for Mobile Robots in Uncertain Environments", 2003.*

Zhu et al. "Pipe Routing = Path Planning (with Many Constraints)", IEEE 2001.*

Asmara et al. "Automatic Piping System in Ship", 2006.*

Nagib et al. "Path Planning for a Mobile Robot Using Genetic Algorithms" 2004.*

Redding et al. "A Real-time Obstacle Detection and Reactive Path Planning System for Autonomous Small-Scale Helicopters", AIAA 2007.*

Kabul et al. "Cable Route Planning in Complex Environments Using Constrained Sampling", 2007.*

Wang et al. "Approximation Algorithms for Curvature Constrained Shortest Paths", 1996.*

Zhu et al. "Pipe Routing = Path Planning (with Many Constraints)", 1991.*

Guirardello, et al. Published in Computers & Chemical Engineering, Pergamon Press, vol. 30, No. 1, Nov. 15, 2005 (pp. 99-114); Magazine.

Bohlin, et al. Published in Robotics And Automation, Proceedings, ICRA '00, IEEE International Conference, vol. 1, Apr. 24, 2000 (pp. 521-528); Magazine.

Kabul, et al. Published in Proceedings of the 2007 ACM Symposium on Solid and Physical Modeling, Beijing China, Jun. 4, 2007 (pp. 395-402); Magazine.

Third Office Action dated Dec. 21, 2012 in connection with Japanese Patent Application No. 2011-516645, 3 pages.

Chinese Office Action dated Mar. 18, 2013, for Appl. No. 200980133315.0 (16 pages).

* cited by examiner

SYSTEM AND METHOD FOR COLLISION-FREE CAD DESIGN OF PIPE AND TUBE PATHS

CROSS-REFERENCE TO OTHER APPLICATION

This application claims priority from U.S. Provisional Patent Application 61/075,927, filed Jun. 26, 2008, which is hereby incorporated by reference.

TECHNICAL FIELD

The present disclosure is directed, in general, to computer-aided design, manufacturing, and visualization systems, collectively described as CAD systems herein.

BACKGROUND OF THE DISCLOSURE

CAD systems are used for designing, visualizing, and manufacturing simple and complex systems. CAD systems allow users to design graphic models of objects and systems before or instead of manufacturing the physical items.

SUMMARY OF THE DISCLOSURE

Disclosed embodiments include a system, method, and computer program product for automated creation of collision-free paths for pipes and tubes in a CAD system. An exemplary method includes receiving inputs, in a data processing system, defining at least a start point and destination point for a pipe in a CAD environment, and a diameter for the pipe. The method includes determining sample points between the start point and destination point. The method also includes building a graph including the sample points and the start point and the destination points as nodes and a plurality of edges connecting the nodes. The method also includes computing a path through the graph between the start point and the destination point. The method also includes, for each node in the path, testing each edge connected to the node to determine if there is a collision along the edge between a test object model and a background model geometry in the CAD environment, and removing from the graph any edge that has a collision. If there is no collision along an edge of the path, then designating the path as a successful path and displaying the successful path to a user by the data processing system.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
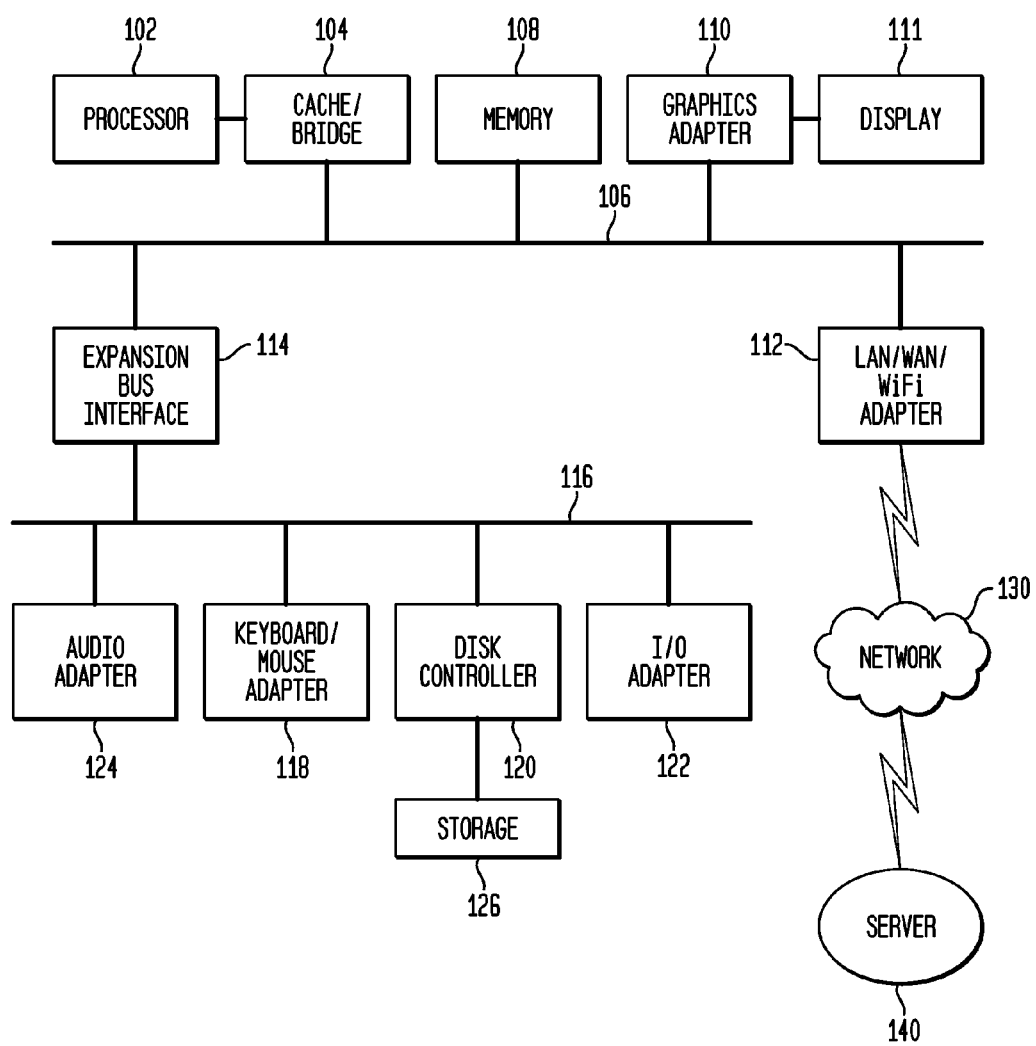
FIG. 1 depicts a block diagram of a data processing system in which an embodiment of the disclosed system and method can be implemented.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Definitions: Following are short definitions of the usual meanings of some of the technical terms which are used in the present application. (However, those of ordinary skill will recognize whether the context requires a different meaning.) Additional definitions can be found in the standard technical dictionaries and journals.

Facet Data: Facet data is used by some CAD and CAD data visualization systems to store or model solid bodies. Facet data consists of groups (also called meshes) of triangles. These triangles are fitted together such that the facets form a surface that approximates a solid body.

Pipe/Tube: The terms Pipe and Tube are generally used interchangeably herein, and the use of one term is intended to encompass the use of the other term. Various disclosed embodiments model and treat pipes as chains of circular cylinders. The final modeled pipe may have a more detailed model that includes fillet curves that model "bends" in the pipe or elbows. The figures below, and FIG. 10 in particular, illustrate examples of the pipes modeled with different options. Various disclosed embodiments, in the simplest implementations, treat all pipes as having no bends or elbows.

Bend/Joint: A bend or joint is a location that marks a change in direction of the pipe. These terms are generally used interchangeably herein. Preferred embodiments treat these as just simple points that join the lines of pipes together (end to end), however, in other embodiments customers or users can define transitions at these locations. A transition may be a bend in the pipe, in which case the pipe is a single piece of piping material that has been bent using a bending machine. Another possible transition is through an elbow, which is a separate fitting inserted on the ends of the pipe sections.

Pipes and tubes are typically modeled in a CAD system as a set of end-to-end connected lines and arcs. Users of the CAD systems create these curves by defining various properties (such as bend radius, and pipe material) and the locations of the defining points of those curves. Pipes and tubes connect one item (or system) to another system or item. Examples of items may include tees (to define a branch), pumps or tanks.

The start and end points of the pipes are defined by the destination items (such as an inlet on a tank). Some of the intermediate defining points can be specified by picking existing entities (such as arc-centers for going through bulkheads). Other intermediate defining points must be defined in free-space. Defining points in free space can be especially difficult as there is no reference geometry and user must "guess" the coordinates of the point.

In addition obstacles between the start and the end of the pipe require the user define additional points. Avoiding obstacles typically requires that users iteratively create points until they have a set of defining points that defines a pipe which doesn't interfere or collide with obstacles. This process can require a considerable amount of effort as it requires that the user repeatedly modify and re-inspect a piping path.

Disclosed embodiments include systems, methods, and computer program products for automatically determining a set of intermediate defining points through free-space that results in a collision-free pipe or tube. These methods compute these defining points in an interactive environment, in an amount of time that is proportional to the complexity of the model (i.e. number of obstacles). The disclosed methods handle obstacles defined using faceted CAD data in a three-dimensional CAD system.

FIG. 1 depicts a block diagram of a data processing system in which an embodiment of the disclosed system and method can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Defining pipes and tubes through free-space is a very time consuming operation. Shipbuilding customers in particular spend a large amount of time defining piping systems. Up to a third of the weight of a ship, for example, is from the piping systems. In tight confined spaces (such as an engine block) it is very difficult for users to define collision-free paths. Disclosed embodiments include a tool that automatically builds collision-free paths for pipes and tubes.

Disclosed embodiments include a system and method for finding a collision-free path for a pipe or tube, sometimes referred to herein as "Quick Path". The process detects obstacles, modeled in some embodiments as faceted geometry, and avoids those obstacles while also trying to minimize or satisfy certain design constraints. The disclosed embodiments thereby create a valid path for the pipe or tube. The resulting path may not be globally optimal in the context of the broader system, but can then modified by the user or designer, reducing the overall effort required to define a pipe.

In some embodiments, Quick Path uses two primary sets of constraints that drive the determination of a valid set of path points. Hard Constraints are constraints that Quick Path guarantees will not be violated by the resulting path. Soft Constraints are constraints that Quick Path attempts to satisfy while finding a path, but does not guarantee that they will be satisfied by the resulting path. In addition to the constraints, Quick Path also tries to minimize the number of joints in the resulting pipe as well as the overall length of the pipe.

Figure 2:
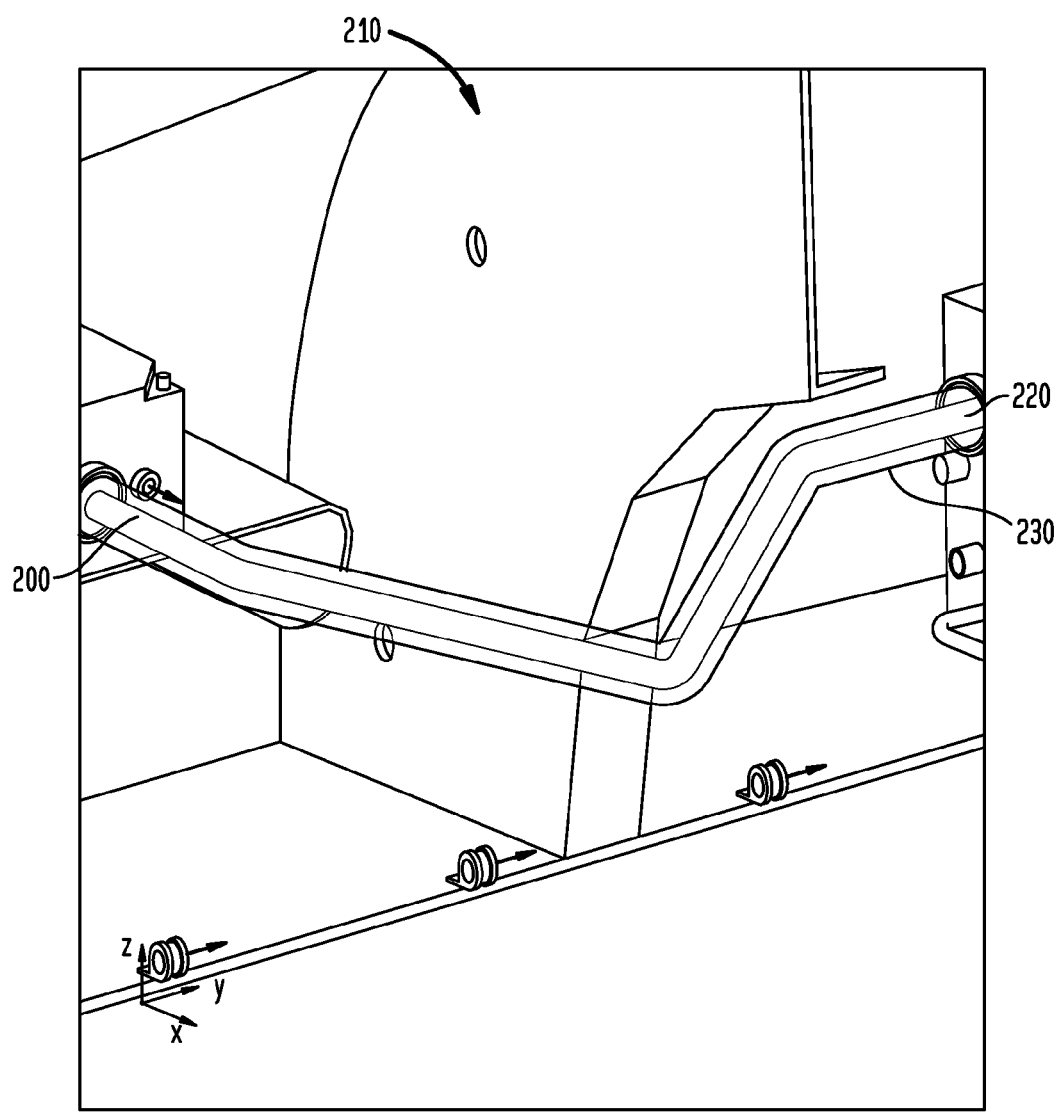
FIG. 2 shows an example of a collision-free path.

FIG. 2 shows an example of a collision-free path. One hard constraint is a collision-free path, where the resulting piping path 200 will have no collisions with obstacles, such as obstacle 210 in the 3D model. Quick Path models the pipe as a chain of cylinders that are of the same diameter. The diameter of the cylinders consists of the diameter of the material specified by the user plus the clearance value defined by the user. The resulting path will have no collisions between these cylinders and the 3d-model. The inner solid body is the diameter of the pipe 220 and the outer solid 230 is the diameter of the pipe combined with a clearance value.

Figure 3A:
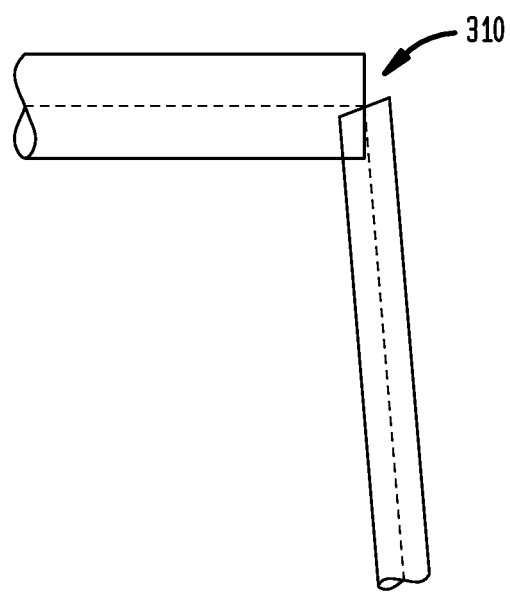
FIG. 3A shows an acceptable self-intersection at a joint between two cylinders.
Figure 3B:
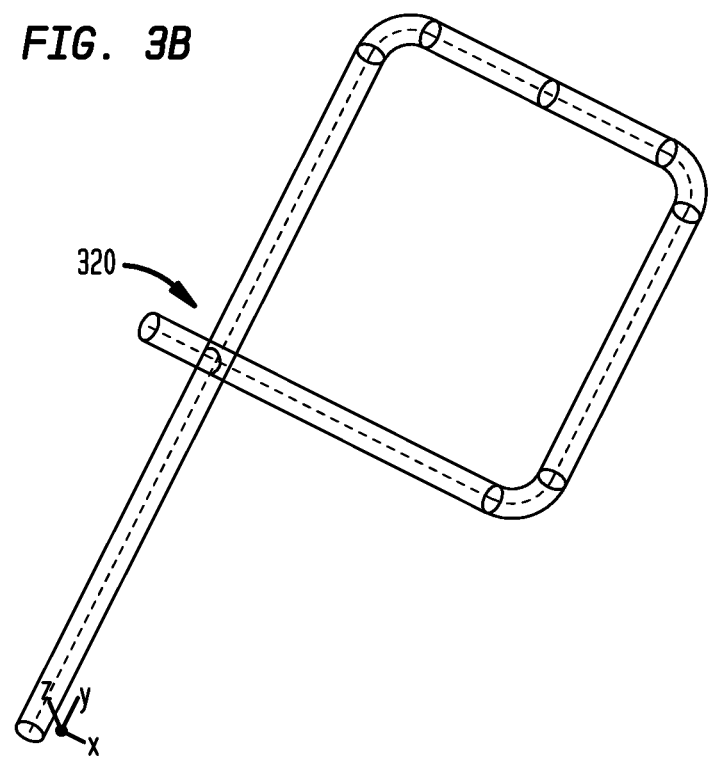
FIG. 3B shows an invalid self-intersection.

Another hard constraint is no self-intersections, so that the resulting path will not intersect itself except at the joint locations that join each cylinder in the chain. FIG. 3A shows an acceptable self-intersection 310 at a joint between two cylinders. FIG. 3B shows a self-intersection 320 that Quick Path will not allow when determining path points; it is an invalid self-intersection, not at a joint.

Soft constraints include Minimum Straight Length, which is the minimum length of each straight section of the pipe, and Maximum Number of Bends, which is the maximum number of bends or joints to allow in the resulting pipe.

Figure 4A:
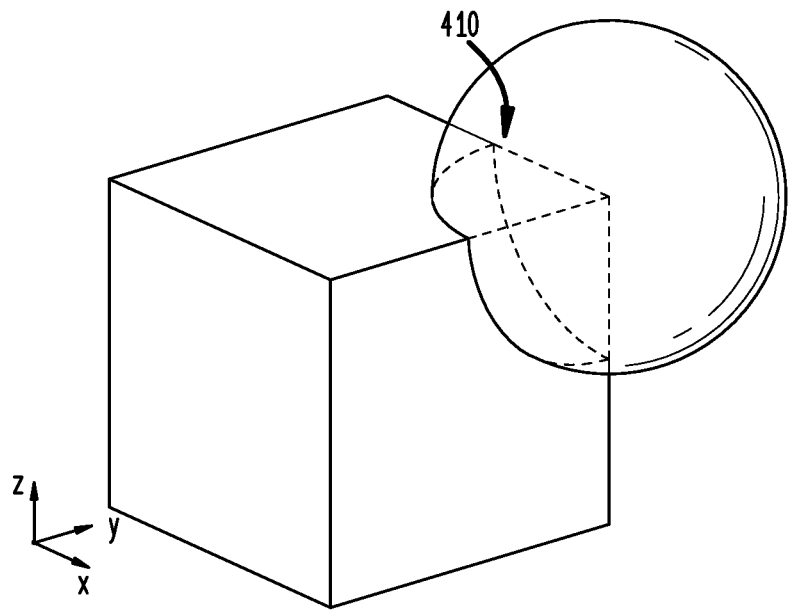
FIG. 4A illustrates interference when two object boundaries overlap.
Figure 4B:
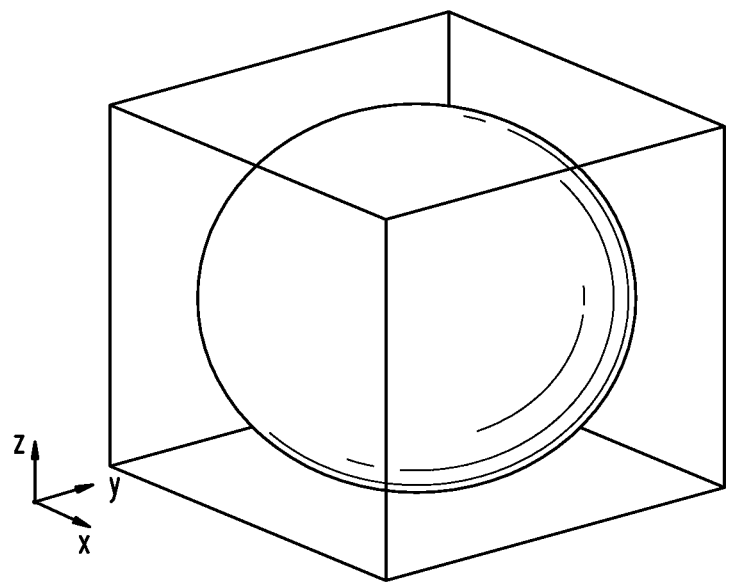
FIG. 4B illustrates containment, when one object is inside another.

Quick Path uses a collision detection process for ensuring that the resulting path does not interfere collide with any of the geometry in the 3D model. The collision detection process supports collision checks for interference and containment (one object inside another. FIG. 4A illustrates interference, when two object boundaries overlap at 410; FIG. 4B illustrates containment, when one object is inside another. The collision detection system should support collision checks of cylinders, spheres and blocks against faceted CAD data.

In some embodiments, the data structure and process for collision-detection is based off of the OBB-Tree algorithm, known to those of skill in the art, and described, for example, in S. Gottschalk, M. Lin, and D. Manocha. OBB-Tree: A hierarchical structure for rapid interference detection. Proc. of ACM Siggraph'96, pages 171-180, 1996, hereby incorporated by reference. The OBB-Tree stores a hierarchy of boxes that enclose geometry. The underlying geometry enclosed by the boxes may be either groups of faceted solid data or basic 3D shapes like spheres, and cylinders. Various Quick Path embodiments initialize the collision-detection system by examining all of the geometry in the current model and building the OBB-Tree structure for that geometry. The geometry in the model is marked as "background" geometry.

The collision-detection system iterates over each piece of foreground geometry and performs a collision check between that foreground geometry and each piece of the background geometry. The checker stops all processing of the foreground geometry as soon as the checker finds a collision between that foreground geometry and a piece of background geometry.

The first stage of the collision check iterates over every piece of geometry in the set of background objects and finds those objects that have the potential of interfering with the foreground geometry by performing an OBB-OBB interference check down the hierarchy of the OBB-Tree.

The second stage performs low-level interference checks between the foreground geometry and any background geometry that was not excluded by the OBB-OBB interference checks. The low level geometry checks can be implemented using a Cylinder-Cylinder check and a Cylinder-Triangle check as described, for example in M. Held, ERIT—a collection of efficient and reliable intersection tests, Journal of Graphics Tools, Vol 2, issue 4:25-44 (1997), known to those of skill in the art and hereby incorporated by reference. A Sphere-Triangle check can be implemented according to, for example, E. Karabassi, G. Papaioannou, and T. Theoharis, Intersection test for collision detection in particle systems, Journal of Graphics Tools, Vol 4, issue 1, pages 25-37, 1999, known to those of skill in the art and hereby incorporated by reference.

The next step is to determine whether or not the foreground geometry object is inside of a background object, or vice-versa. This step is only performed on foreground geometry that has no interference; that is, it passed the collision check with no collisions. The containment check simply draws an infinite ray from some arbitrary point in the foreground geometry towards some arbitrary direction. The ray is then checked for intersections with the background geometry that potentially contains the foreground geometry. If the ray intersects an odd number of times, then the foreground geometry is inside the background geometry. The check is then repeated only with the point at an arbitrary location on the background geometry and the ray intersected with the foreground geometry. This simple check is based off the well known Ray Casting Algorithm for determining if a point is inside of a polygon, for example as described in the Wikipedia article for "Point in Polygon", found at time of filing at en.wikipedia.org/wiki/Point_in_polygon.

Figure 5:
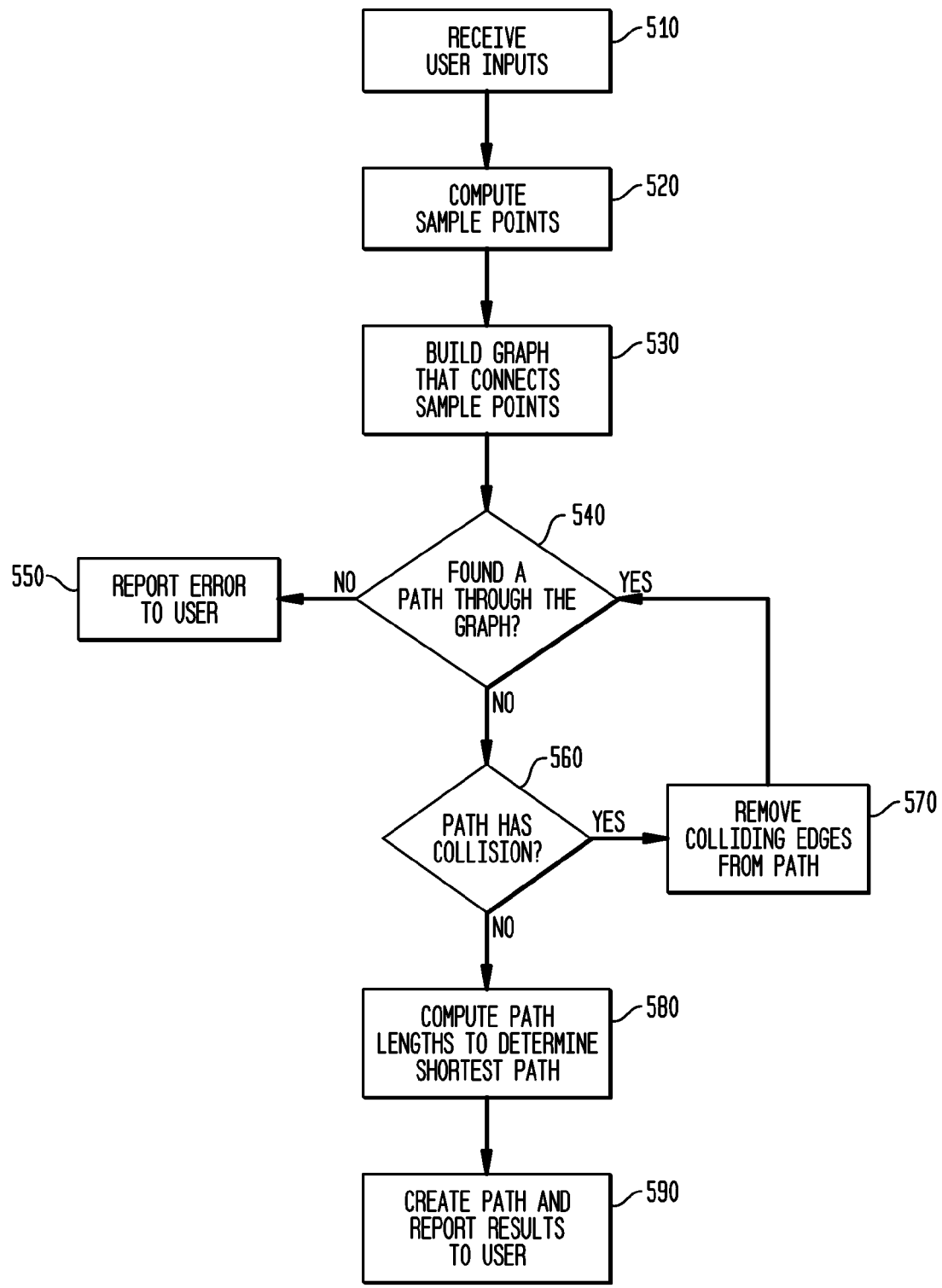
FIG. 5 depicts a process in accordance with a disclosed embodiment.

FIG. 5 depicts a process in accordance with a disclosed embodiment.

Some of the techniques used in a Quick Path process are similar to some of the concepts for path-planning in robotics applications. There are a variety of path-planning techniques that have been researched for robotics, such as those described in S. M. LaValle, Planning Algorithms, Cambridge University Press, Cambridge, U.K., 2006, known to those of skill in the art and hereby incorporated by reference.

The Quick Path tool process can be compared to a path-finding problem for a robot. The robot must find its way through space while avoiding collisions. In the general case a robot may have d-dimensions of movement (e.g. nine for a robot with a joint. In the Quick Path process, the "robot" can be considered as a sphere with three dimensions of freedom.

Techniques used herein are similar to those that fall under the subset of robotics algorithms known as "Probabilistic Roadmap Planners" (PRM). In a PRM system, the model is converted from a continuous space into a discrete space. Most PRM planners accomplish this by computing various orientations and positions of the object that must move through space (the "robot") and connecting these orientations and positions with motions. This forms a graph where the nodes of the graph are orientations and positions of the robot and edges are motions of the robot between those orientations and positions. Various algorithms from graph theory are then used to compute a valid set of motions from the initial configuration/location of the robot to the final configuration/location of the robot.

Some aspects of the Quick Path process can be implemented using a modification to and specialization of the Lazy Probabilistic Roadmap described, for example, in R. Bohlin and L. E. Kavraki, A lazy PRM for single query path planning, Proc. of the IEEE Int. Conf. on Robotics and Automation, 2000, known to those of skill in the art and hereby incorporated by reference. The lazy PRM algorithm attempts to minimize the number of collision checks (which are expensive) by simply avoiding them until after a path is found. The lazy PRM first builds a graph of random configurations of the robot with random connections between those configurations. Then the lazy PRM computes a path, checks for collisions only along that path and removes any configurations from that path that result in a collision. The process repeats until a collision-free path is discovered.

A goal of lazy PRM is to avoid collision checks as they are the most expensive step in the computation of a valid path. In complicated models, the lazy PRM algorithm results in many, many iterations of traversing the processed graph. This pushes the computation from collision detection to path traversal. A Quick Path process as described herein can use several heuristics to avoid this problem and reduce the overall computation time.

As broadly described, the disclosed process includes such steps as sampling some points in space that have at least enough room around them to accommodate a sphere equal to the pipe diameter; connect those points to form a graph; finding a path through the graph from the start point to the goal point; checking for collisions along the path from start to goal, and removing any edges (on the path) from the graph that collide with background geometry. If there are any collisions, the process repeats with finding a new path.

Referring to the process 500 depicted in FIG. 5, the first step of the Quick Path process is receiving inputs from the user or loaded from a configuration file (step 510). The inputs specify at least the start and destination points, as well as any intermediate points that they want included in the path, and a diameter of the pipe. At each point the user also has the option of specifying a forward and backward extension at each point. An extension defines an area where collisions will not be checked. These extensions are useful as they prevent Quick Path from finding collisions with surfaces such as receptacles that may interfere with the resulting path but are acceptable interferences.

Figure 6:
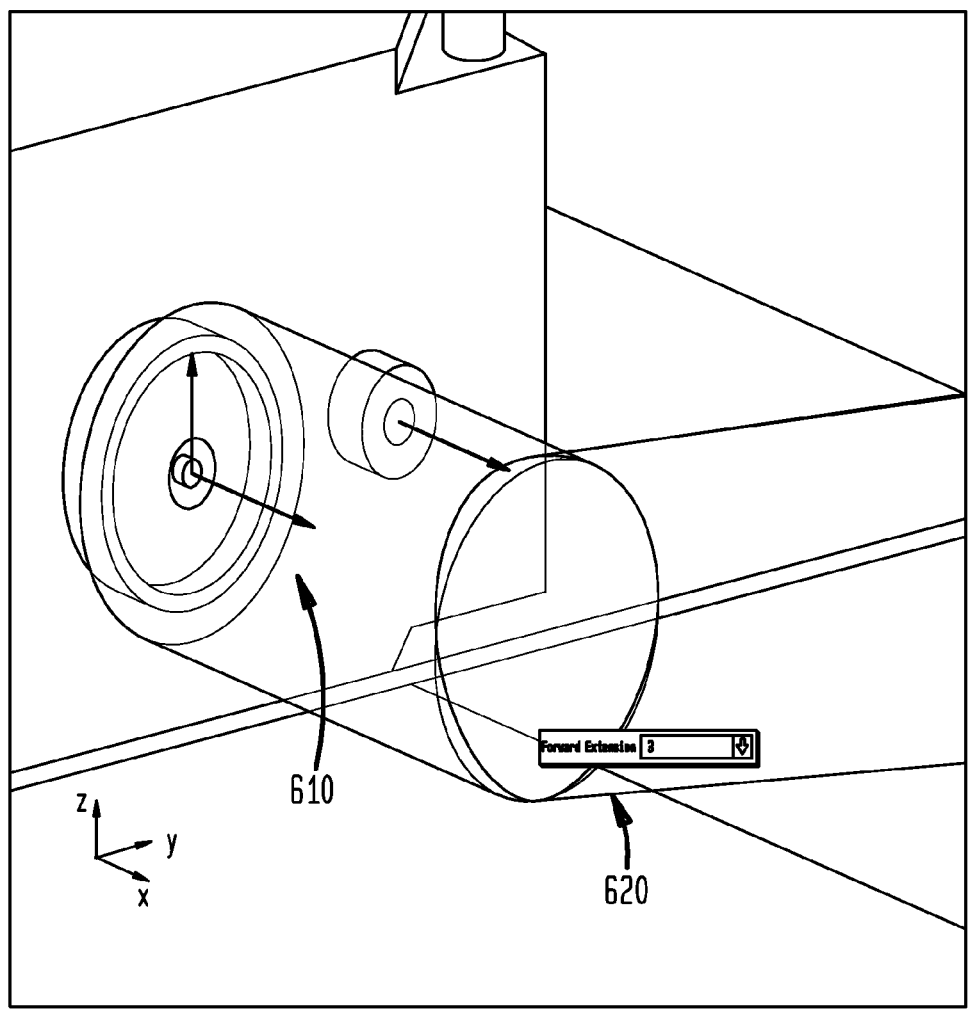
FIG. 6 shows an example of a forward extension.

FIG. 6 shows an example of a forward extension. In that figure, the extension 610 is defined at the start of the path 620, and is used to avoid the interference at the receptacle 630 located at the start point.

In various embodiments, the user can define the following data for the Quick Path. Items marked with (required), in at least one implementation, must be specified by the user before executing the subsequent steps of the process.

Defining points (required): The user must specify at least two non-coincident points, but may specify as many points as desired.

Extension directions and forward/backward lengths: The user may optionally specify these at any of the defining points.

Material or Diameter of the pipe (required): The outer diameter of the pipe is used to enforce that the resulting path has no collisions.

Clearance: The clearance defines an additional area around the axis of the pipe that must be collision free.

Minimum Straight Length and Maximum Number of Bends as described above.

If the user does not specify a direction for a defining point, Quick Path automatically determines an extension direction based off of the geometry chosen by the user to define the defining point. For example, if a user picks a line, the automatic extension direction is the axis of the line. If the geometry has no axis (or the point is in free-space), Quick Path uses the direction between the defining point and the next defining point (previous defining point for the last defining point). Automatic extensions use a forward and backward value of zero.

The next step in the process is to determine sample points (step 520) generally between the start point and destination point, which can then be used as additional intermediate defining points. Determining sample configurations and orientations is used for path-planning and the sampled points influence the resulting path, and whether or not a path can be discovered. There are a variety of sampling methods available for choosing sample locations. Quick Path uses several novel sampling strategies that are designed specifically for the creation of pipes/tubes.

For Quick Path, the "robot" is modeled as a sphere. This reduces the sampling to just points in 3D space (there is no orientation to consider). The discovered path must be collision-free such that the sphere can move from the start defining point to the end defining point without interfering with the background geometry.

Preferably using the lazy PRM algorithm, the system builds a graph including the sample points, the start point, and the destination point and any other defining points as nodes and a plurality of edges connecting the nodes, where the sample points and edges joining those sample points are assumed to be collision-free. For dense models this results in tremendous number of iterations of finding the graph, finding collisions and removing edges from the graph. Quick Path reduces the number of path-finding iterations by ensuring that all of the sample points are collision-free. This up-front collision checking drastically reduces the number of invalid paths in dense models. The collision checks are extremely fast as the collision checks for sphere against faceted data are extremely fast operations.

The Quick Path sampling strategy consists of building a list of collision-free sample spheres in space (which are stored as 3D points) in four stages.

Figure 7:
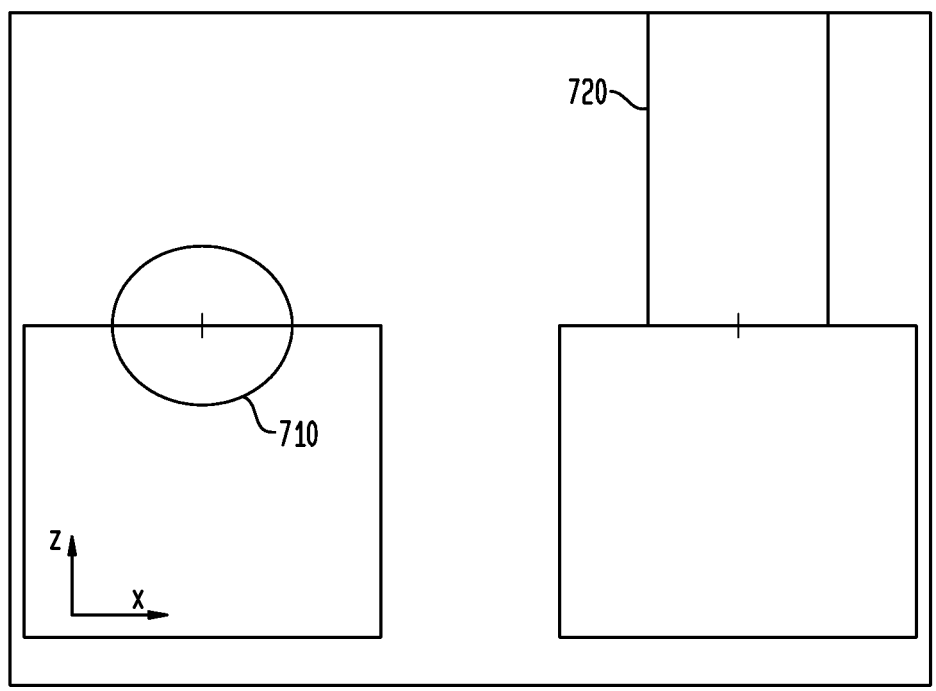
FIG. 7 shows an example defining point with its interfering sphere representation and its non-interfering cylinder representation.

The initial list of points consists of the defining points. These points are defined as being collision-free as a sphere at the defining point will most likely interfere with the existing model. This interference is really a false positive as the eventual pipe or tube starting at that point will be a cap of a cylinder rather than a sphere. FIG. 7 shows an example defining point with its interfering sphere representation 710 and its non-interfering cylinder representation 720.

If a user defines a forward or backward extension value at a defining point, that defining point is replaced by a new point that is offset from the defining point by the user specified extension distance along the extension direction. Quick Path treats the cylindrical section between the defining point and the extension point as collision-free.

Figure 8:
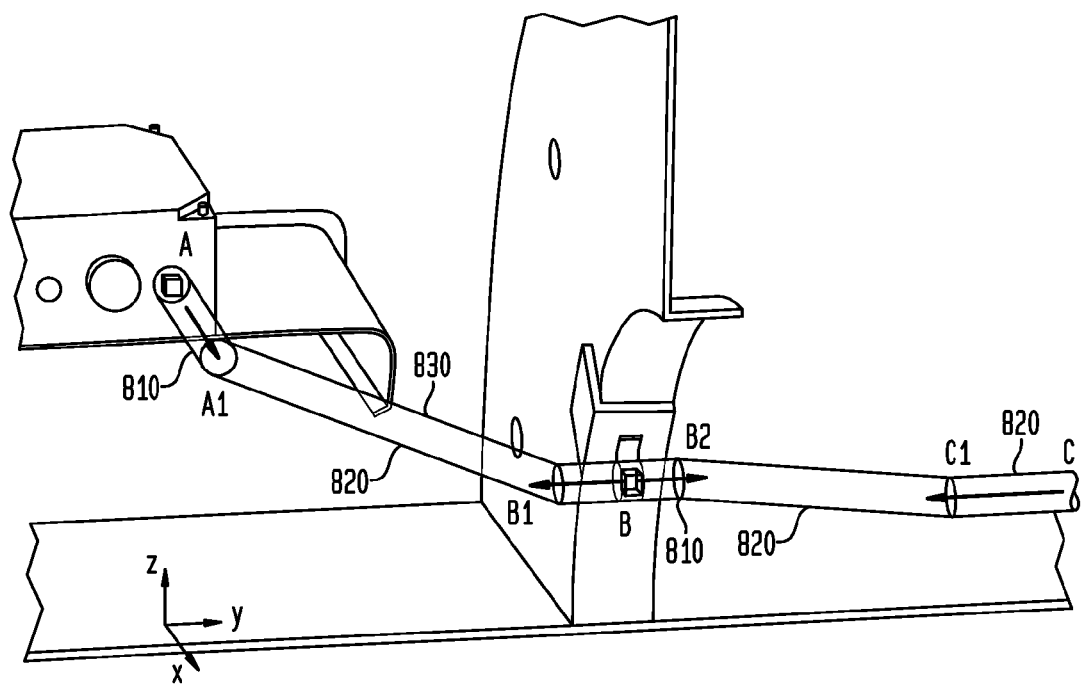
FIG. 8 shows an example of defining points with forward, backward or forward and backward values.

Quick Path computes a path between each pair of the input defining points (or their replacement extension points), which is generally through the graph between the start point and the destination point. FIG. 8 shows an example of defining points with forward, backward or forward and backward values. In that example the user picked points A, B, and C, and defined the forward extension values 810 at A and B, and backward extension values 820 at B and C. Quick Path will determine a path 830 between the points A1 and B1 and another path 840 between points B2 and C1.

Heal points are points computed using several different heuristics. These heuristics define a set of template or prototypical paths and then Quick Path samples points along these template paths. Quick Path computes each of the template paths using each pair of defining points, described above, and the associated extension directions.

There are three basic types of template paths used in various embodiments: Direct, Intersection, and Cardinal. Quick Path computes each of these paths by defining inputs p1, p2 (the original points), v1, v2 (the extension directions) an offset value (d) as well as the input method. Each of the template paths first applies the offset value along the extension direction to each of the respective input points (o1=p1+d*v1, o2=p2+d1*v2). The method then determines which algorithm is used to compute the path between the offset points. The returned template path does not contain any coincident points.

Direct template paths simply join the offset locations with a straight line. So each direct path consists of p1, o1, o2, and p2.

Intersection template paths simply find the intersection points i1, i2 of the two infinite lines defined by (o1, v1) and (o2, v2). The template path then consists of the points p1, o1, i1, i2, o2, and p2. Quick Path discards the path if there is no intersection point between the two lines. The intersection points are the points that define the shortest line between lines (o1, v1) and (o2, v2). One exemplary method for identifying such points is described, at time of filing, in Paul Bourke, The shortest line between two lines in 3D, local.wasp.uwa.edu.au/~pbourke/geometry/lineline3d/, known to those of skill in the art and hereby incorporated by reference.

Cardinal template paths compute two new locations using the cardinal directions (X,Y,Z) to join the offset locations of the input points. There are six sub-methods associated with this type of template path, each method defines a specific order in which the cardinal directions are applied. For example the sub-method XYZ first applies the X direction, then the Y then the Z. The computed template path is p1, o1, c1, c2, o2, and p2, where c1 and c2 are defined in Table 1.

TABLE 1

Sub-methods for the Cardinal template path.

| Sub-Method | c1 (x, y, z) | c2 (x, y, z) |
|---|---|---|
| XYZ | (p2[X], p1[Y], p1[Z]) | (p2[X], p2[Y], p1[Z]) |
| XZY | (p2[X], p1[Y], p1[Z]) | (p2[X], p1[Y], p2[Z]) |
| YXZ | (p1[X], p2[Y], p1[Z]) | (p2[X], p2[Y], p1[Z]) |
| YZX | (p1[X], p2[Y], p1[Z]) | (p1[X], p2[Y], p2[Z]) |
| ZXY | (p1[X], p1[Y], p2[Z]) | (p2[X], p1[Y], p2[Z]) |
| ZYX | (p1[X], p1[Y], p2[Z]) | (p1[X], p2[Y], p2[Z]) |

Quick Path iteratively computes heal paths by cycling over the different heal methods and sub-methods. For each method, Quick Path computes heal paths using the combinations of extension vectors (v1, v2), (−v1, v2), (v1, −v2) and (v1,−v2). For each combination, Quick Path computes the heal path using an extension value that is equal to the distance between p1 and p2 times the current iteration number (k) divided by of the max number of iterations (m). The pseudo-code in Algorithm 2.1 shows the algorithm Algorithm 2.1: ADDHEALPOINTS (p0,v0,p1,v1)

distance ← DISTANCE(p0, p1)

max ← the maximum number of extension value to test.

-continued

Algorithm 2.1: ADDHEALPOINTS (p0,v0,p1,v1)

for each m ∈ heal path method and submethod do {
  for each (first, second) ∈ (v0, v1), (−v0, v1), (v0, −v1), (−v0, −v1),
  do {
    for k ← 0 to max
    do {
      extension ← distance * k / max
      COMPUTEHEALPATH (p0, first, p1, second, extension)
    }
  }
}

Quick Path computes the axially-aligned bounding box of the template path locations and limits the collision checking to only that background geometry that either intersects with or is contained by that bounding box. This step reduces the amount of background geometry to check collisions against as all computed paths will be inside of the bounding box.

Quick Path samples a fixed number of points (100 points in the current implementation) along each of the lines defined by the template paths. Each point is checked for a collision against the background geometry (as a sphere) and only those points that have no-interferences are kept.

Grid Points: After determining the sample points along the template paths, Quick Path then computes sample points along 3D grids centered at the defining points. These grids contain a fixed number of sample points and are computed using a delta offset based off the maximum extent in the X, Y, and Z directions divided by the cube root of the number of sample points to compute for the grid.

In addition, Quick Path also stores sample points at the intersection of each of the template path lines computed for the Heal Path points, with the XY, XZ, and YZ planes in the grid.

Random Points: The previous steps compute a large number of sample points. The sample points in the previous steps are completely deterministic (same inputs always results in the same set of sample points). The deterministic sample points define very simple paths (straight lines along template paths, lines along grid planes) that are very useful for generating linear pipe paths. However, these sample points may not be sufficient for finding a path in a very dense or cluttered model. If the point sampling is not dense enough, or if there happens to be obstacles such that the previous techniques produce very few valid sample points, the returned path may not be very optimal, i.e. it computes a pipe that is too complicated or long, or the path may not be discovered at all. Randomized sampling methods, as well as reasons why random points lead to better results in dense models, are known to those of skill in the art, and are described, for example in N. M. Amato and Y. Wu., A randomized roadmap method for path and manipulation planning, IEEE Int. Conf. Robot. & Autom., pages 113-120, 1996, hereby incorporated by reference.

Quick Path chooses a large number of random points inside of the bounding box computed above, and each random point is checked for collisions against the background geometry in the box. In various embodiments, Quick Path ensures that the resulting list of sample points has at least 2000 random collision-free points.

Referring again to the process of FIG. 5, the system will then build a graph that connects sample points (step 530). Quick Path uses several heuristics to join sample points to each other in the graph data structure. This graph must be kept relatively small to avoid excessive memory usage, and must be well suited for shortest path searches.

Quick Path first attempts to connect each sample point to the other sample points nearest to it. Each sample point is connected to either the k nearest points, wherein in at least one embodiment, k=5, or to all of the points within the sphere with a diameter equal to the pipe diameter (plus clearance) centered at the sample point. Quick Path connects the sample point to the set of points (k-nearest, or in sphere) that has the largest number of points. Connecting points so close together allows Quick Path to take small incremental steps when determining the pipe path. One suitable algorithm for finding the nearest points (and points within a sphere), known to those of skill in the art, is described at time of filing by D. Mount and S. Arya, ANN: A Library for Approximate Nearest Neighbor Searching, www.cs.umd.edu/~mount/ANN/, hereby incorporated by reference.

The second heuristic joins each sample point with at least j random sample points, with j=10 in some implementations. These random points are not already joined with the sample point. These random connections allow Quick Path to take large steps (find distant sample points) and potentially find the path between the goal points in fewer steps.

Quick Path then joins together each of the pairs of defining points. If there is no obstacle between the defining points then returned path will simply be the line that joins the defining points. Adding the edge between the defining points ensures that Quick Path will find that single line without searching the entire graph.

The last set of edges that Quick Path creates is between each of the sample points computed in the Heal Points step and m random other Heal Points as well as to each of the defining points, where m=20 in some implementations. These extra connections encourage Quick Path to find paths that are more like the template paths computed in the Heal Path step.

After building the graph at step 530, Quick Path examines all of the edges attached to the defining points (step 540). Quick Path tests each edge for a collision against any background model geometry by building a cylinder with a radius equal to the radius of the pipe plus the clearance value between the defining point and the other point defined by the edge. Quick Path performs this collision checking on every edge attached to the defining points to attempt to find at least one path through the graph.

If all of the edges attached to one or more defining points have collisions, then there are no possible collision-free paths between the defining points. Checking all of the edges attached to the defining points has the advantage of quickly detecting cases where the user has chosen a point that is completely inside of a enclosed area (such as the middle of a fitting, or inside a closed room) that would take an extremely long time to detect by iteratively finding paths in the subsequent steps.

Figure 9:
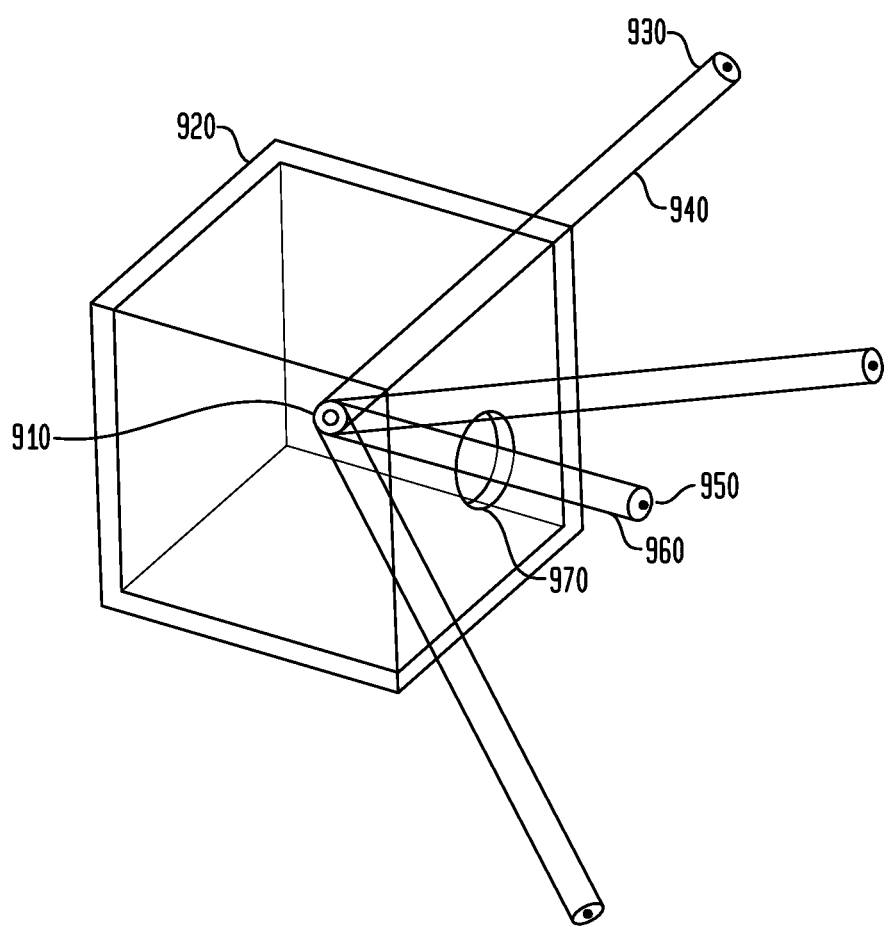
FIG. 9 illustrates collision checking between defining points against a background geometry.

FIG. 9 shows an example of collision checking in accordance with a disclosed embodiment. In this example, the system is checking for collisions on paths between a first defining point 910, generally inside background geometry box model 920, to the other defining points. All illustrated, there is a collision to defining point 930 along path 940, since it intersects box 920, and similar collisions to other defining points. The system has found a valid (no collision) path to defining point 950 along path 960, since it passes through hold 970 in box 920.

If none of the edges coming out of a defining point is collision-free, for example if there were no hole 970 in box 920 of FIG. 9, then there is no possible path, and the system reports this to the user and stops all further processing (step 550). An additional advantage is that this reduces the number of potentially invalid paths that Quick Path may examine.

Finding a Path in the Graph: At least some implementations use the well known A* algorithm for finding the shortest path through the graph, as described in the Wikipedia entry for A* Search Algorithm at en.wikipedia.org/wiki/A*_search_algorithm at time of filing. In this case the shortest path is not necessarily the path with the shortest length, but the path that is as short as possible while satisfying as many soft constraints as possible. Other known algorithms are suitable for finding the shortest paths; Dijkstras algorithm and other variations from the A* algorithm such as IDA* and SMA* can replace A* in Quick Path process.

The heuristic used by Quick Path is simply the cost function (defined below) applied to the path with an assumption that the last node in the path is directly connected to the goal sample point.

The cost for a given path is the sum of:

The current path length divided by the distance between the two defining points times an arbitrary weight value w1.

The number of bends in the current path divided by the maximum number of bends allowed. If the maximum number of bends allowed is 0, then the number of bends is treated as zero. This value is multiplied by another arbitrary weight value w2.

The number of linear sections of the path that are less than the minimum straight length. These linear sections may encompass more than one point in the path if there are collinear points in the path. This value is multiplied by an arbitrary penalty factor e1.

The number of self-intersections in the path, as described above. This value is multiplied by an arbitrary penalty factor e2.

The weights w1 and w2, in various embodiments, must add up to less than or equal to 1.0. These weights ensure that if a path has no violations of hard constraints (such as self-intersections), then the total cost of the path will be less than or equal to 1.0. A perfect path is a straight line between the two defining points, it has a cost of zero. At least one implementation of the Quick Path process uses w1=w2=0.5, this gives an equal weight towards reducing path length and reducing the number of bends.

The error factors e1 and e2, in various embodiments, must be greater than or equal to 1.0. This ensures that paths that have violations of constraints have a cost greater than 1.0. The higher the penalty, the more costly the path and the less desirable it is. At least one implementation of Quick Path uses e1=e2=1.0.

This cost function has several important features. The first feature is that the cost function attempts to minimize the overall length of the pipe. Pipes that are shorter usually are less expensive to produce and manufacture. This length minimization is achieved by dividing the length of a "perfect" pipe (a straight line) by the length of the path. The longer the path, the smaller that value is. Because the cost function subtracts this value from 1.0, the smaller the value the closer to 1.0 the value of the path will be.

In addition to minimizing the length the cost function also attempts to reduce the number of bends. If the number of bends in the path is greater than the user defined maximum number of bends, then this term will end up becoming greater than 1.0 (which is then multiplied by the weight factor w2) resulting in a path cost that will be potentially greater than 1.0.

It is possible to violate the maximum number of bends and still have a cost less than 1.0, however this is an accepted condition of the Quick Path algorithm as described above.

The minimum straight length violations and the number of self intersections automatically push the path cost over 1.0 if either of them is not zero. These put a heavy cost on any violations of those constraints and reduce the likelihood that Quick Path will choose such paths. In addition Quick Path eliminates any paths that have self-intersections by skipping such paths when they are encountered as being the shortest path in the graph to the vertex (Quick Path takes the second shortest, etc.).

Examining Shortest Paths: Once Quick Path has found a shortest path, the previous step ensures that the path starts and ends at the desired defining points and has no self intersections. If the previous step could not find a path (at step 540), Quick Path stops processing and reports this as an error to the user (step 550).

Quick Path builds a 3D cylinder to represent each of the lines in the shortest path. Quick Path then performs a collision check between this chain of 3D cylinders and the background geometry including other object models (step 560). Edges that have a collision are marked as "invalid" and are ignored in the path finding step. Edges that do not have a collision are marked as "checked" and are not checked again by the collision checker.

After performing the collision check on the edges of the shortest path, Quick Path performs another collision check. The second collision check is for all edges attached to nodes of edges on which Quick Path encountered a collision in the previous collision check. This extra check clears out dead-end paths that the shortest path algorithm may find on subsequent shortest path searches.

If a node is on the shortest path and a collision is encountered at that node, then it is likely that the shortest path algorithm will find that node on the shortest path on the next search. An extra collision check will remove many invalid paths in the graph that are near the original shortest path (step 570), this can dramatically reduce the number of potential shortest paths that must be examined by Quick Path.

Figure 10:
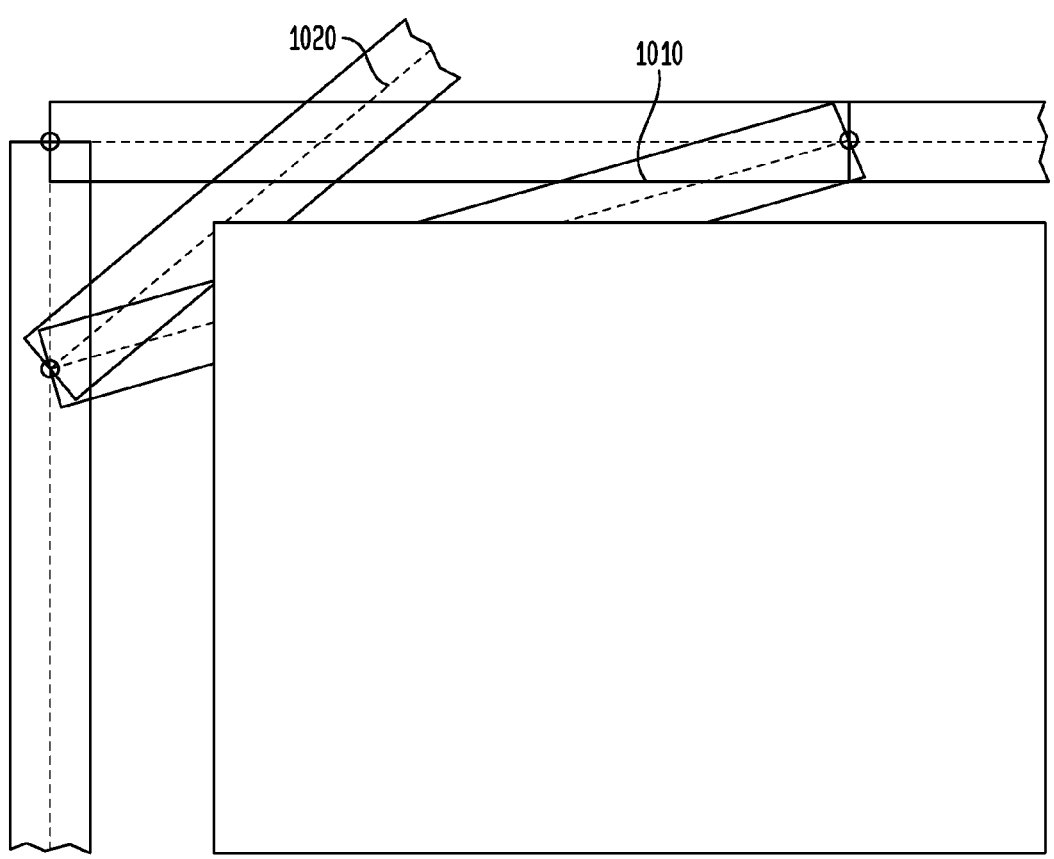
FIG. 10 shows an example of a collision check on a shortest-path.

FIG. 10 shows an example of the advantage of the extra collision check. In that example the shortest path (solid) 1010 has a collision. Removing the other colliding edge 1020 would prevent the shortest path algorithm from traversing down the dashed colliding edge. In this figure, the shortest path is shown as a solid line; secondary paths are shown as dashed lines.

If any of the edges in the shortest path collide, Quick Path restarts the shortest path algorithm after performing all of its collision checks (returning to step 540). This process continues until Quick Path either finds a path with no collisions, or the shortest path algorithm is unable to find any path.

Results of the Quick Path process: Quick Path reports any errors it encounters to the user. In various embodiments, there are only two error conditions reported to the user: not enough free space around a defining point and path cannot be found between defining points.

The system may perform a separate process for determining the shortest path (step 580). Quick Path post processes the collision-free path to remove any collinear points, designates the path as a successful path, and creates a CAD representation of the resulting path to model the pipe or tube (step 590). The CAD representation of the pipe can then be modified by the user in the CAD system, if required, to get the desired pipe model.

Quick Path solves the problem of defining a pipe or tube by reducing the amount of labor required by a user to define a pipe or tube. With a small amount of effort, users can get an initial tube or pipe that matches their input constraints (start/end point, clearance, etc). In many cases the generated pipe or tube will be acceptable to users. If the tube or pipe is not acceptable then the user can edit the tube or pipe using the existing CAD tools for modifying pipes.

Figure 11:
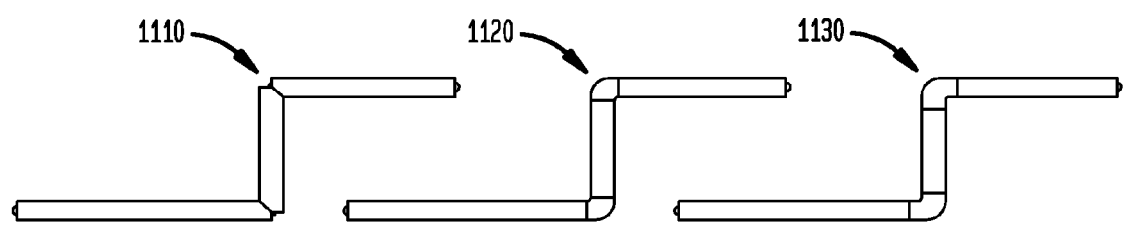
FIG. 11 illustrates examples of a pipe modeled with different options.

FIG. 11 illustrates examples of a pipe modeled with different options. In this figure, a pipe is modeled with a default connection 1110, a connection with bends 1120, and a connection with elbows 1130.

U.S. Pat. No. 7,444,269, incorporated by reference, describes a routing method differs from Quick Path in that it attempts to find a globally optimal tube. The functionality only supports a limited set of obstacles (e.g. blocks) and requires the user input these blocks. The run-time of the algorithm can be quite long if there are a large number of obstacles.

Those of skill in the art will recognize that there are a variety of path planning algorithms that could be used instead of the lazy-PRM algorithm used by the preferred Quick Path process described above. Replacing lazy-PRM with another algorithm would not necessarily change the results achieved by Quick Path (i.e. the resulting path), but would change the run-time of the algorithm. Most PRM algorithms require a large amount of time building the initial graph because each of the edges must be validated before accepting that edge in the graph.

Other PRM algorithms, such as the algorithm described in S. M. LaValle, Rapidly-exploring random trees: A new tool for path planning. TR 98-11, Computer Science Dept., Iowa State Univ, October 1998, known to those of skill in the art and incorporated by reference, build the roadmap graph on-the-fly. This eliminates the up-front penalty in building the graph. The results using such algorithms are usually poorly suited for reducing costs or handling constraints.

Those of skill in the art will recognize that there are other methods for finding paths that can be classified as "brute-force". These algorithms do not break the problem down into a solution of discrete problem, instead they leave the problem as a search through continuous space for a solution. They typically require generating a guess path by some means (maybe random, maybe deterministic), seeing if the path collides and then repeating using some criteria to modify that path in each iteration. For example, some implementations may use a genetic algorithm to modify the test path (or paths) in each iteration of the process. Other implementations may define a single guess path and iteratively modifying the path, evaluating constraints in each iteration. These variations have the potential for finding lower-cost paths than the preferred Quick Path process described above, but they typically require many iterations for even small models and each iteration requires a large amount of computation (evaluation of cost, collision checks for the path, determining the next step).

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for automated creation of collision-free paths for pipes and tubes in a CAD system, comprising:
    receiving inputs, in a data processing system, defining at least a start point and destination point for a pipe in a CAD environment, an extension value corresponding to the start point, and a diameter for the pipe;
    determining an extension point, by the data processing system, according to the start point and the extension value;
    determining, by the data processing system, sample points between the extension point and destination point;
    building a graph, by the data processing system, including the sample points and the extension point and the destination points as nodes and a plurality of edges connecting the nodes, and including an edge between the start point and the extension point that is designated as collision-free;
    computing a plurality of paths, by the data processing system, through the graph between the extension point and the destination point;
    for each node in each path, testing each edge connected to the node, by the data processing system, to determine if there is a collision along the edge between a test object model and a background model geometry in the CAD environment, and removing from the graph any edge that has a collision; and
    if there is no collision along any edge of a path of the plurality of paths, then designating that path as a successful path;
    determining, by the data processing system, a shortest successful path of any designated successful paths, wherein the shortest path is determined according to a number of linear sections of the path that are less than a selected minimum straight length;
    processing the shortest successful path to remove at least one collinear point; and
    displaying the shortest successful path to a user by the data processing system.

2. The method of claim 1, wherein determining a shortest successful path includes identifying a designated successful path that does not violate a hard constraint and satisfies as many of a plurality of soft constraints as possible.

3. The method of claim 2, wherein the shortest path is also determined according to a length of the path and a number of bends in the path.

4. The method of claim 2, wherein the shortest path is also determined according to a number of self-intersections in the path.

5. The method of claim 1, wherein the test object model is a sphere.

6. The method of claim 1, further comprising marking at least one edge as checked when the edge does not have a collision.

7. The method of claim 1, further comprising building a pipe comprising a plurality of three-dimensional cylinders along the computer path.

8. The method of claim 1, wherein the process is repeated at the computing step when there is no successful path.

9. A data processing system comprising a processor and accessibly memory, the date processing system configured for automated creation of collision-free paths for pipes and tubes in a CAD system by performing the steps of:
    receiving inputs defining at least a start point and destination point for a pipe in a CAD environment, an extension value corresponding to the start point, and a diameter for the pipe;
    determining an extension point according to the start point and the extension value;
    determining sample points between the extension point and destination point;
    building a graph including the sample points and the extension point and the destination points as nodes and a plurality of edges connecting the nodes, and including an edge between the start point and the extension point that is designated as collision-free;
    computing a plurality of paths through the graph between the extension point and the destination point;
    for each node in each path, testing each edge connected to the node to determine if there is a collision along the edge between a test object model and a background model geometry in the CAD environment, and removing from the graph any edge that has a collision; and
    if there is no collision along any edge of a path of the plurality of paths, then designating that path as a successful path;
    determining a shortest successful path of any designated successful paths, wherein the shortest path is determined according to a number of linear sections of the path that are less than a selected minimum straight length;
    processing the shortest successful path to remove at least one collinear point; and
    displaying the shortest successful path to a user by the data processing system.

10. The data processing system of claim 9, wherein determining a shortest successful path includes identifying a designated successful path that does not violate a hard constraint and satisfies as many of a plurality of soft constraints as possible.

11. The data processing system of claim 10, wherein the shortest path is also determined according to a length of the path and a number of bends in the path.

12. The data processing system of claim 10, wherein the shortest path is also determined according to a number of self-intersections in the path.

13. The data processing system of claim 9, wherein the test object model is a sphere with a diameter at least as great as the received diameter of the pipe.

14. The data processing system of claim 9, the data processing system further configured to perform the step of marking at least one edge as checked when the edge does not have a collision.

15. The data processing system of claim 9, the data processing system further configured to perform the step of building a pipe comprising a plurality of three-dimensional cylinders along the computer path.

16. The data processing system of claim 9, wherein the data processing system repeats at the computing step when there is no successful path.

17. A computer program product comprising a tangible machine-readable medium encoded with computer-executable instructions that when executed cause a data processing system to perform the steps of:

receiving inputs defining at least a start point and destination point for a pipe in a CAD environment, an extension value corresponding to the start point, and a diameter for the pipe;

determining an extension point according to the start point and the extension value;

determining sample points between the extension point and destination point;

building a graph including the sample points and the extension point and the destination points as nodes and a plurality of edges connecting the nodes, and including an edge between the start point and the extension point that is designated as collision-free;

computing a plurality of paths through the graph between the extension point and the destination point;

for each node in each path, testing each edge connected to the node to determine if there is a collision along the edge between a test object model and a background model geometry in the CAD environment, and removing from the graph any edge that has a collision; and if there is no collision along any edge of a path of the plurality of paths, then designating that path as a successful path;

determining a shortest successful path of any designated successful paths, wherein the shortest path is determined according to a number of linear sections of the path that are less than a selected minimum straight length;

processing the shortest successful path to remove at least one collinear point; and displaying the shortest successful path to a user by the data processing system.

18. The computer program product of claim 17, wherein determining a shortest successful path includes identifying a designated successful path that does not violate a hard constraint and satisfies as many of a plurality of soft constraints as possible.

19. The computer program product of claim 18, wherein the shortest path is also determined according to a length of the path and a number of bends in the path.

20. The computer program product of claim 18, wherein the shortest path is also determined according to a number of self-intersections in the path.

21. The computer program product of claim 17, wherein the test object model is a sphere with a diameter at least as great as the received diameter of the pipe.

22. The computer program product of claim 17, the tangible machine-readable medium further encoded with computer-executable instructions for marking at least one edge as checked when the edge does not have a collision.

23. The computer program product of claim 17, the tangible machine-readable medium further encoded with computer-executable instructions for building a pipe comprising a plurality of three-dimensional cylinders along the computer path.

24. The computer program product of claim 17, wherein the data processing system repeats at the computing step when there is no successful path.

* * * * *